(12) United States Patent
Friedman et al.

(10) Patent No.: US 12,386,983 B2
(45) Date of Patent: Aug. 12, 2025

(54) DATA POLICIES FOR ONLINE SERVICES

(71) Applicant: Microsoft Technology Licensing, LLC, Redmond, WA (US)

(72) Inventors: Arie Friedman, Lane Cove (AU); Hadas Bitran, Ramat Hasharon (IL); Uri Barash, Tel Mond (IL); Marc Davis, San Francisco, CA (US); Oded Nahir, Hofit (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 738 days.

(21) Appl. No.: 17/100,759

(22) Filed: Nov. 20, 2020

(65) Prior Publication Data
US 2021/0073399 A1    Mar. 11, 2021

Related U.S. Application Data

(63) Continuation of application No. 13/341,865, filed on Dec. 30, 2011, now Pat. No. 10,853,505.

(51) Int. Cl.
G06F 21/60 (2013.01)
G06F 21/62 (2013.01)
G06Q 30/02 (2023.01)
G06Q 30/0251 (2023.01)

(52) U.S. Cl.
CPC ........ G06F 21/604 (2013.01); G06F 21/6263 (2013.01); G06Q 30/0251 (2013.01)

(58) Field of Classification Search
CPC .............. G06F 21/604; G06F 21/6263; G06Q 30/0251
See application file for complete search history.

(56) References Cited

U.S. PATENT DOCUMENTS 7,290,219 B2 * 10/2007 Boyles .................. G06F 3/0481
                                                          715/825
7,464,273 B2 * 12/2008 Kugai ..................... G06F 21/10
                                                          705/51
7,590,705 B2    9/2009 Mathew et al.
(Continued)

OTHER PUBLICATIONS

Anton, et al., "Analyzing website privacy requirements using a privacy goal taxonomy", Retrieved at «http://ieeexplore.ieee.org/stamp/stamp.jsp?tp=&amnumber=1048502», Proceedings of the IEEE Joint International Conference on Requirements Engineering (RE), 2002, 9 pages.

(Continued)

Primary Examiner — Kambiz Zand
Assistant Examiner — Afaq Ali
(74) Attorney, Agent, or Firm — Calfee, Halter & Griswold LLP

(57) ABSTRACT

An online service may maintain or create data for a user, and a user may be allowed to exert control over how the data are used. In one example, there may be several categories of data, and the user may be able to specify who may use the data, and the purpose for which the data may be used. Additionally, a user may be able to see how many of his "friends" (or other contacts) have extended trust to a particular entity, which may aid the user in making a decision about whether to extend trust to that entity. User interfaces may be provided to allow users to specify how their data are to be used.

20 Claims, 5 Drawing Sheets

(56) References Cited

U.S. PATENT DOCUMENTS

| | | | |
|---|---|---|---|
| 8,250,096 | B2 | 8/2012 | Su et al. |
| 8,380,796 | B2 | 2/2013 | Robertson et al. |
| 2003/0069853 | A1* | 4/2003 | Bryant .................. G06F 21/109 |
| | | | 705/51 |
| 2005/0091101 | A1 | 4/2005 | Epling et al. |
| 2005/0171715 | A1* | 8/2005 | Saitoh .............. G11B 20/00173 |
| | | | 702/82 |
| 2007/0256043 | A1* | 11/2007 | Peters .................... G06F 40/18 |
| | | | 716/119 |
| 2008/0000964 | A1 | 1/2008 | Flake et al. |
| 2009/0249451 | A1* | 10/2009 | Su ....................... G06F 21/6218 |
| | | | 726/5 |
| 2009/0300512 | A1 | 12/2009 | Ahn |
| 2009/0300716 | A1* | 12/2009 | Ahn .................... H04L 63/0876 |
| | | | 726/1 |
| 2010/0125630 | A1 | 5/2010 | Krishnamurthy et al. |
| 2010/0153695 | A1 | 6/2010 | Bussard et al. |
| 2010/0269158 | A1 | 10/2010 | Ehler et al. |
| 2010/0318571 | A1 | 12/2010 | Pearlman et al. |
| 2011/0250968 | A1* | 10/2011 | Os .......................... A63F 13/85 |
| | | | 463/43 |
| 2012/0136936 | A1* | 5/2012 | Quintuna ............ G06F 21/6245 |
| | | | 709/204 |
| 2012/0143694 | A1* | 6/2012 | Zargahi .............. G06Q 30/0603 |
| | | | 705/14.66 |
| 2012/0323750 | A1* | 12/2012 | Sivaramakrishnan .... H04L 9/14 |
| | | | 713/165 |
| 2013/0054481 | A1* | 2/2013 | Upadhyaya ............ G16H 40/67 |
| | | | 705/319 |
| 2013/0117365 | A1 | 5/2013 | Padmanabhan et al. |
| 2013/0174274 | A1 | 7/2013 | Friedman et al. |

OTHER PUBLICATIONS

Lichtenstein, et al., "Adding value to online privacy for consumers: Remedying deficiencies in online privacy policies with an holistic approach", Retrieved at «http://ieeexplore.ieee.org/stamp/stamp.jsp?p=&arnumber=1174470», Proceedings of the 36th Hawaii International Conference on System Sciences (HICSS), Jan. 6-9, 2003, 10 pages.

Eldin, et al., "Towards users driven privacy control", Retrieved at «http://ieeexplore.ieee.org/stamp/stamp.jsp?tp=&arnumber=1401269», IEEE International Conference on Systems, Man and Cybernetics, Oct. 2004, pp. 4673-4679.

Kolter, et al., "Generating user-understandable privacy preferences", Retrieved at «http://ieeexplore.ieee.org/stamp/stamp.jsp?tp=&arnumber=5066486», International Conference on Availability, Reliability and Security, Mar. 2009, pp. 299-306.

Kelley, et al., "Standardizing Privacy Notices: An Online Study of the Nutrition Label Approach", Retrieved at «http://www.cylab.cmu.edu/files/pdfs/tech_reports/CMUCyLab09014.pdf», Jan. 12, 2010, 13 pages (cover page plus pp. 1-12).

"Privacy Nutrition Labels", Retrieved at «http://cups.cs.cmu.edu/privacyLabel/», Retrieved Date: Dec. 28, 2011, 1 page.

"Benefit from the Data Economy", Retrieved at « https://statz.com/Sell/Statz_Take_Control_and_Own_Your_Data.aspx », Retrieved Date: Mar. 29, 2011, 1 page.

"Creative Commons", Retrieved at « https://creativecommons.org/about », Retrieved Date: Mar. 29, 2011, pp. 1-3.

"Display Screen with User Interface", Design U.S. Appl. No. 29/383,912, , filed Jan. 24, 2011, inventors: Hadas Bitran, Arie Friedman and Dana Cohen Baron, 2 pages (1 page of text, plus 1 drawing sheet).

"Display Screen with User Interface", Design U.S. Appl. No. 29/383,913, filed Jan. 24, 2011, inventors: Hadas Bitran, Arie Friedman and Dana Cohen Baron, 2 pages (1 page of text, plus 1 drawing sheet).

"Display Screen with Animated User Interface", Design U.S. Appl. No. 29/383,917, filed Jan. 24, 2011, inventors: Hadas Bitran, Arie Friedman and Dana Cohen Baron, 16 pages (2 pages of text, plus 14 drawing sheets).

"Non-Final Office Action for U.S. Appl. No. 13/341,865", Mailed Date: Nov. 6, 2014, 13 Pages.

"Reply to the Non-Final Office Action for U.S. Appl. No. 13/341,865", Filed Date: May 6, 2015, 9 Pages.

"Final Office Action for U.S. Appl. No. 13/341,865", Mailed Date: Jun. 12, 2015, 14 Pages.

"Reply to Final Office Action for U.S. Appl. No. 13/341,865", Filed Date: Dec. 17, 2015, 8 Pages.

"Non-Final Office Action for U.S. Appl. No. 13/341,865", Mailed Date: Aug. 19, 2016, 13 Pages.

"Reply to Non-Final Office Action for U.S. Appl. No. 13/341,865", Filed Date: Nov. 18, 2016, 20 Pages.

"Final Office Action for U.S. Appl. No. 13/341,865", Mailed Date: Mar. 8, 2017, 12 Pages.

"Notice of Appeal for U.S. Appl. No. 13/341,865", Filed Date: May 15, 2017, 2 Pages.

"Pre-Appeal Brief Conference Request for U.S. Appl. No. 13/341,865", filed May 15, 2017, 5 Pages.

"Pre-Appeal Brief Conference Decision for U.S. Appl. No. 13/341,865", Mailed Date: Jun. 1, 2017, 2 Pages.

"Non-Final Office Action for U.S. Appl. No. 13/341,865", Mailed Date: Jun. 12, 2017, 13 Pages.

Kelley, "A "Nutrition Label" for Privacy", Symposium on Usable Privacy and Security (SOUPS), Jul. 15-17, 2009, 12 Pages, Mountain View, CA, USA.

"Notice of Appeal for U.S. Appl. No. 13/341,865", Filed Date: Aug. 31, 2017, 2 Pages.

"Pre-Appeal Brief Conference Decision for U.S. Appl. No. 13/341,865", Mailed Date: Apr. 20, 2018, 2 Pages.

"Appeal Brief for United States U.S. Appl. No. 13/341,865", filed May 18, 2018, 37 Pages.

"Examiner's Answer to Appeal Brief for U.S. Appl. No. 13/341,865", Mailed Date: Oct. 2, 2018, 17 Pages.

"Second or Subsequent Examiner's Answer to Appeal Brief for U.S. Appl. No. 13/341,865", Mailed Date: Oct. 29, 2018, 17 Pages.

"Reply Brief for U.S. Appl. No. 13/341,865", filed Dec. 3, 2018, 19 Pages.

"Patent Board Decision for U.S. Appl. No. 13/341,865", Mailed Date: Apr. 16, 2020, 7 Pages.

"Notice of Allowance and Fees Due for U.S. Appl. No. 13/341,865", Mailed Date: Jul. 31, 2020, 6 Pages.

* cited by examiner

DATA POLICIES FOR ONLINE SERVICES

RELATED APPLICATION

This application is a continuation of U.S. patent application Ser. No. 13/341,865, filed on Dec. 30, 2011, and entitled "DATA POLICIES FOR ONLINE SERVICES." The entirety of this application is incorporated herein by reference.

BACKGROUND

Online services often allow users the ability to control who can use data that the users place on the services. For example, the Facebook social networking service allows users to specify who can read a post, or view a picture. Photo-sharing sites such as Flickr often allow users to specify who can view the photos that users post. Online document repositories also allow users to specify the read and write permissions for documents.

Different types of services have different permission models. In a social networking site, a user typically can post content such as a photo, and can either make the content public, or can limit access to friends, friends of friends, networks, circles, etc. Many photo sharing sites have similar permission systems. Document repositories often allow users to make a document public, or to limit access to the document to specific users or groups of users.

However, in many cases these types of permissions do not provide a sufficiently rich level of control.

SUMMARY

An online service may allow users to control who can use the users' data, and also what can be done with that data. Moreover, in some circumstances a user may be able to see what entities other users trust with their data, which can help the user decide whom to trust.

A system that provides users with control over data may define several classes of data—e.g., contact information, health information, cookies, etc. For each class of data, the user may specify both who is allowed to use the data, and what such a user is allowed to do with the data. For example, a user might specify that his contact information can be used by a company in order to allow the company to provide services to the user, but not for telemarketing purposes. In this way, a permission is effectively a combination of three pieces of information: a kind of data, who can use that kind of data, and for what purpose. A user interface may be provided that allows users to select the data that is to be shared, with whom, and for what purpose.

Additionally, users of a service may have the opportunity to see which entities are trusted by other users. For example, if a user is making a decision about whether to allow data to be shared with another entity, the user may be able to see how many other users (or how many of the user's friends) trust that entity. Whether one user can see whom another user trusts may itself be the subject of permission. That is, the fact that a user has extended trust to another entity is, itself, a type of data, and the user can determine whether or not the fact of trusting another entity is to be shared with other users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
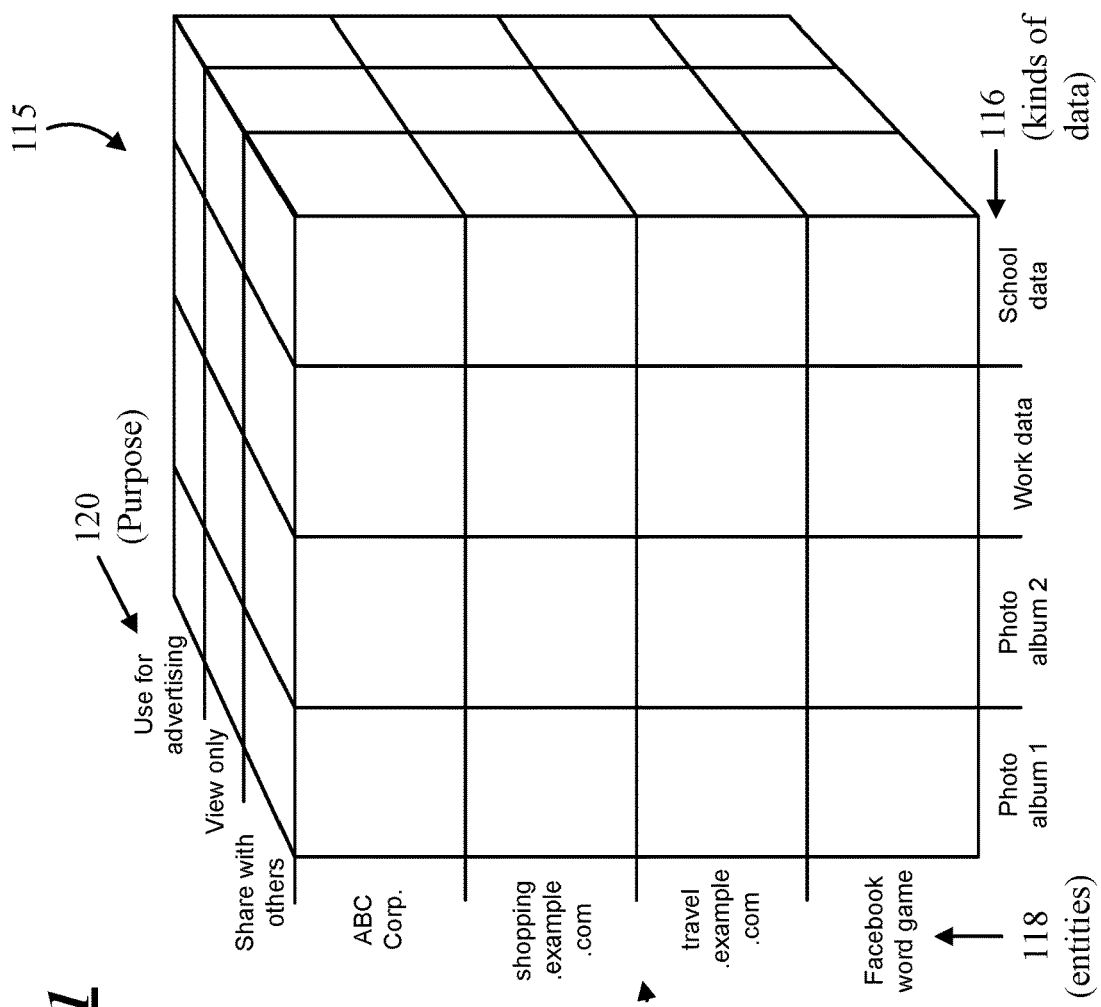
FIG. 1 is a block diagram of an example service in which a user can control how data is used.
Figure 1:
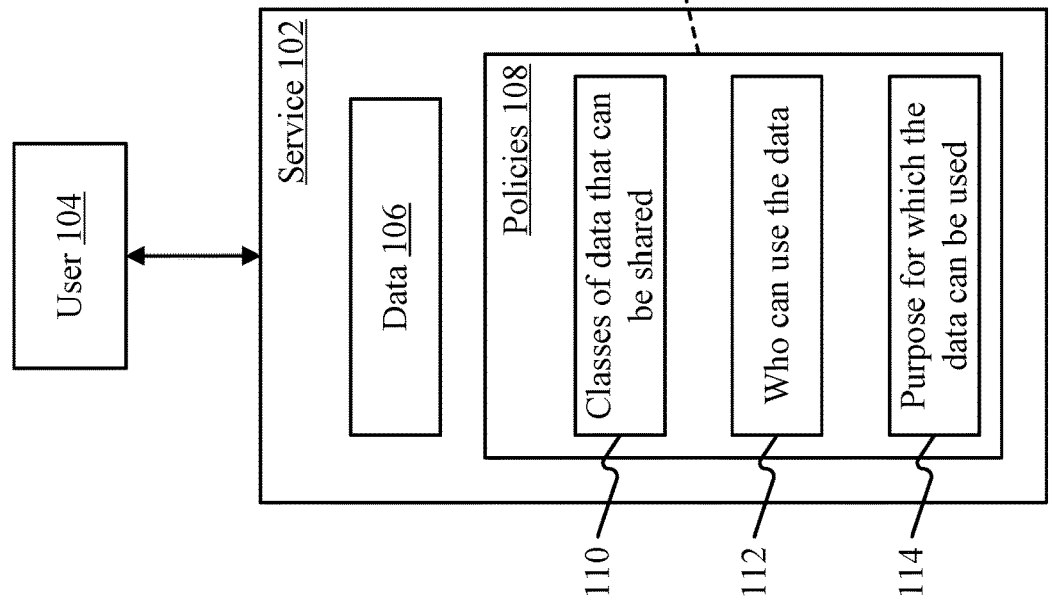

Online services often allow users to control how their data is used. For example, users can upload photos to a photo-sharing site, and can determine whether to share a given photo album (or an individual photo) with the public, with the user's friends, with the user's friends of friends, or with some other defined group. Users may also provide other kinds of data to service (e.g., personal data, financial data, healthcare data), and may decide with whom this data is to be shared.

Policies such as "available to public" or "available only to my friends" provide users with some level of control over who can use their data. However, one issue that arises with these types of policies is that they typically do not allow control over how the data is used. If a user decides to share photos or other data with his friends, the friends typically have free rein to decide what to do with the data that has been shared with them. There might be some formal, technical, or procedural restrictions. E.g., in a social networking site, a user might share a photo album with his friends, while denying the friends the right to "re-share" that photo album with others. Thus, the social networking site will deny the friends the ability to use that site's sharing feature to redistribute the photos. However, this is effectively a procedural restriction on what can be done with the photo, not a substantive one.

Similarly, a user might decide to share some type of data with non-person entity rather than a particular person. This type of sharing often happens on Facebook, where users decide whether to let certain applications access their personal data—e.g., if one wants to play Wordscraper on Facebook, then one has to let the Wordscraper application access the user's personal data. This presents a problem, in the sense that the grant or denial of access is plenary. Either the user has to let Wordscraper access the user's personal data and do whatever it wants with the data (subject only to the good discretion of Wordscraper's designers and maintainers), or else has to deny Wordscraper access to the user's data (thereby preventing the user from using the application at all). A user might not object to a game application's accessing his or her data for the purpose of facilitating game play with other users, but might not want the application to use the user's data for the purpose of targeted advertising and promotion. Online services generally do not offer these types of substantive restrictions on how a user's data is used.

The subject matter described herein provides techniques for allowing users to control how their data is used in online services. Data may be divided into types or categories. For any given entity, the user who owns the data may specify which categories of data may be used by that entity, and for what purpose the entity may use the data. For example, a user might choose to allow a given entity to use his contact information for all purposes other than marketing, and his browser cookies for maintenance and administrative issues relating to the online service. That same user might also store healthcare or financial data on the site, but might choose to deny all access to such private data.

Additionally, when a user chooses to trust an entity with some type of data, the fact that this trust has been extended might be made available to other users (e.g., to the user's friends). The other users might use this information to decide whether to extend trust to the same entities. For example, if a user sees that his friends have extended trust to a particular game, or to a particular company, that user might be more likely to extend trust himself. It is noted, however, that the fact that a person has extended trust is, in itself, a piece of data that the user can choose either to share, or not to share. For example, a user might extent trust to an online dating service in order to allow that dating service to see his or her personal data. However, the same user might not want his friends to know that he uses a dating service, so—despite having given the dating service the right to see his personal data—he might deny his friends the right to see the fact that he has extended this trust.

A user interface may be provided to allow users to set the privacy parameters on their data. For example, for each entity there could be a table in which the rows are specific types of data (e.g., contact information, cookies, financial data, etc.), and the columns are actions that can be performed with those data (e.g., use for site administration, use for marketing, sharing the data with other entities, etc.). There could be certain defaults. E.g., the default might be no sharing unless the user opts in. Or, in another example, the default might be to allow sharing of very basic data such as the user's name unless the user opts out, but to deny sharing of any other data unless the user opts in.

It is noted that a system that allows a user to choose the purpose for which data can be used is not the same as, and is not obvious in view of, a system that allows a user to choose different types of permissions separately, such as read, write, and execute permissions. In a system that allows a user to grant read, write, and execute permissions separately, an entity that has the right to read (or write, or execute) data can read (or write, or execute) the data for any purpose. On the other hand, a system that allows a user to choose a purpose permits one to specify that an entity can read (or write, or execute, etc.) data for one purpose, but nor for another purpose, thereby extending the concept of separate read, write, execute permissions to a finer-grained level of control.

Turning now to the drawings, FIG. 1 shows an example service in which a user can control how data is used. Service 102 is any type of online service—e.g., a social networking service, an e-mail service, a document repository, an online retailer, etc. User 104 may interact with service 102. In the course of interacting with service 102, user 104 may provide or generate some data 106 that is associated with user 104's use of service 102. Data 106 may take various forms. In one example, data 106 is text, photos, video, audio, or other content that user 104 provides to be stored on service 102. For example, if service 102 is a social networking service, user 104 might upload some photos to the service, or might provide some text comments. If service 102 is a document repository, then user 104 might use online word processor or spreadsheet programs to create documents, or might upload existing documents to be stored with the service; in this case, data 106 would include those documents. If service 102 is a gaming service, then user 104 might play a game, thereby generating some gaming data to be stored (e.g., current score in the game, specific trophies earned, number of "lives" left in the game, etc.). The foregoing are a few examples of data, but the subject matter herein is not limited to these specific examples. Moreover, in the foregoing examples, user 104 provides data to be stored on service 102. However, there are situations in which data 106 might be stored with the user, but would still be considered data relating to service 102, and that would be subject to service 102's privacy policies. For example, service 102 might store browser cookies on user 104's machine, and may upload these cookies when user 104 uses service 102. Such cookies may be considered data that is subject to service 102's data use policies; therefore, user 104 may choose how such data may be used in accordance with the techniques described herein.

Policies 108 are policies that govern how user 104's data can be used. Policies 108 may include classes of data that can be shared (block 110), rules about who can use a particular class of data (block 112), and the purpose for which the data can be used (block 114). Conceptually, policies represent a 3-dimensional matrix 115, in which one dimension is the kinds of data (arrow 116), one dimension is the entities that can use data (arrow 118), and one dimension is the purpose for which data can be used (arrow 120). Thus, a given element in the matrix is identified by the triple <data-type, entity, purpose>. The value of each element in the matrix may be binary—e.g., true=use-allowed and false=use-disallowed, or 1=use-allowed and 0=use-disallowed.

In the example of FIG. 1, matrix 115 shows various different example classes of data. These classes include photo album 1, photo album 2, work data, and school data. It is noted that the classes of data can be defined at any level of granularity, and classes may be user defined collections that exist specifically for the purpose of attaching different sharing permissions to different types of data. It is noted that school data (i.e., the schools that the user has attended) and work data (i.e., the places where the user has worked) are specific types of data that are defined by a substantive description of what the data represents. In theory, "photos" could be a type of data, but in the example shown photos are divided into specific photo albums. Photo album 1 might contain photos from an office holiday party, and photo album 2 might contain photos of the user's vacation. Although both albums contain photos—and, therefore, might be considered a single class of data—the user may have defined separate photo albums specifically so that he could share one album with coworkers and another album with family—i.e., for the purpose of applying different usage policies to the photos in the two different albums. The subject matter herein can operate on classes of data regardless of how those classes are defined. In theory, a class of data could be as broad as broad as "all data", or as narrow as a single atomic object (e.g., one photo).

Matrix 115 also shows various different entities (or groups of entities) who can be given access to data. The entities in this example include ABC Corp., the web sites shopping.example.com and travel.example.com, and a Facebook word game application. Each of these entities could be given access to different types of data. Additionally, matrix 115 shows various different actions that can be performed with data: "share with others," "view only," and "use for advertising." Thus, in the 3-dimensional graphical depiction of matrix 115 in FIG. 1, a small cube in the matrix corresponds to a combination of (1) a category of data, (2) an entity, and (3) a purpose. Moreover, the value of this "cube" may be an indication of whether use of the data is allowed for the specified combination of category, entity, and purpose—e.g., <school-data, shopping.example.com, marketing>=true means that shopping.example.com can use a particular user's school data for the purpose of marketing. It is noted that the notion of an entity to which permission is being given is not necessarily a specific, literally-named entity. For example, permissions could be given to "all insurance companies," or all entities that conform to a specific security policy (e.g., "all entities that agree not to share data with third parties").

Figure 2:
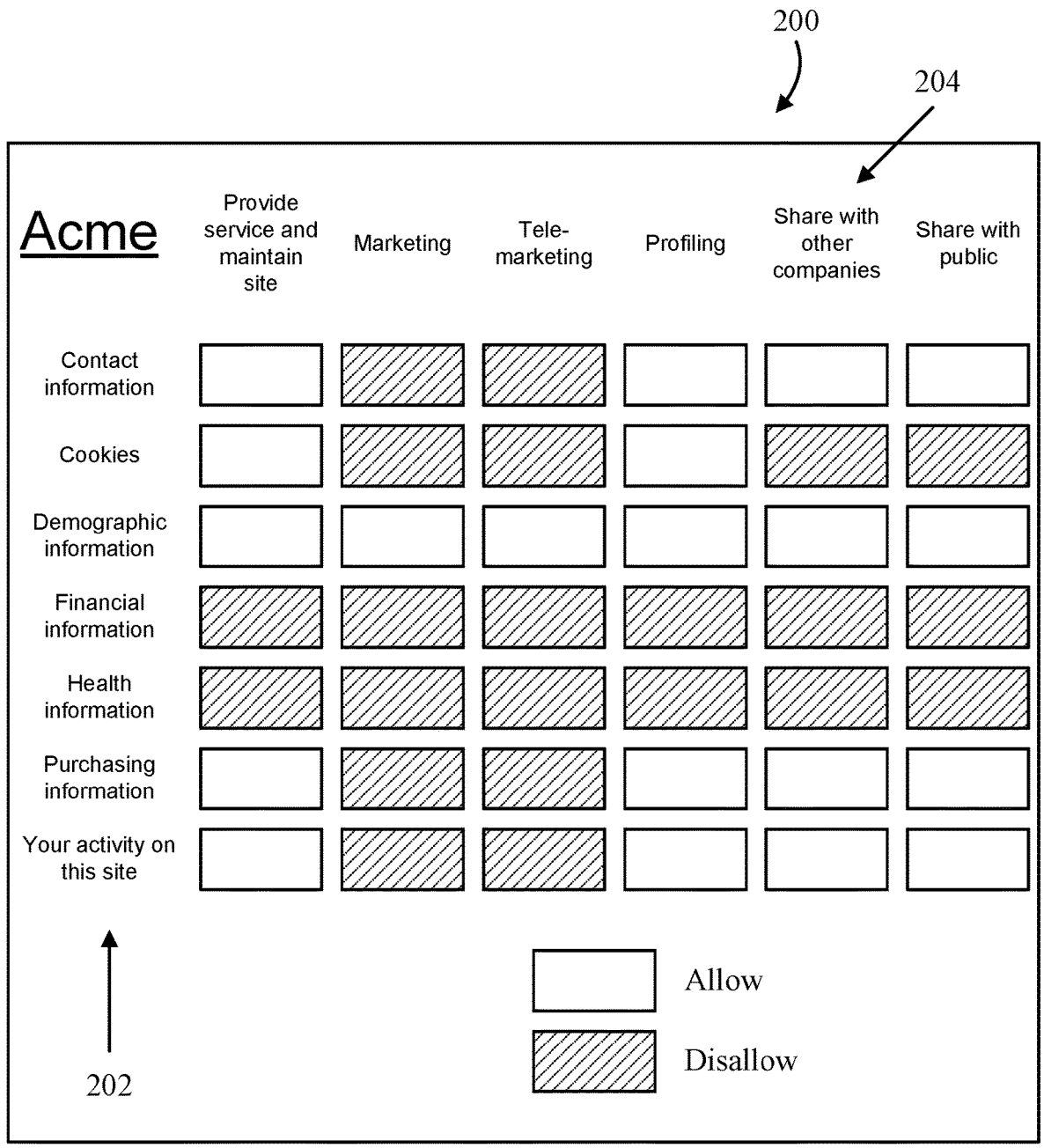
FIG. 2 is a block diagram of an example user interface in which a user may chose categories of data that may be used by an entity, and purposes for which those categories may be used.

Other examples of data categories and purposes are shown in FIG. 2 and are described below.

FIG. 2 shows an example user interface in which a user may choose categories of data that may be used by an entity, and purposes for which data falling into those categories may be used. Interface 200 is an interface that may be used to display and modify the set of permissions for a particular target entity. The example entity in FIG. 2 is "Acme". In other words, interface 200 shows what categories of data a particular user is allowing Acme to use, and for which purposes.

Interface 200 takes the form of a table, in which each of the rows 202 of the table is a particular category of information, and each of the columns 204 is a purpose for which data could (or could not) be used. In the example shown, the various categories of data are: contact information; cookies; demographic information; financial information; health information; purchasing information; government ID; and activity on the site (i.e., the site that implements the service, such as a social networking site). Moreover, the various purposes for which data could be used are: providing service and maintaining the site (e.g., administrative tasks performed by the operator of the site); marketing; telemarketing; and profiling. Moreover, the various purposes for which data could be used includes two variations on sharing the information outside the site: sharing the information with other companies (i.e., companies other than the operator of the site); and sharing the information with public forums.

While the purposes listed in FIG. 2 are merely an example, it can be appreciated that the ability to control the purposes for which an entity can use one's data constitutes a deeper level of control than merely the ability to say that an entity can or cannot use the data.

For each combination of a category and a purpose, the user can either allow or disallow the use of data for that purpose. In the example shown, the empty (white) boxes indicate that the user is allowing use of a particular category of data for the indicated purpose. The diagonal-lined boxes indicate that the user is not allowing the use of data for the indicated purpose. In the example shown, the user has decided not to allow the use of health or financial data for any purpose, but will allow the use of demographic and contact data for some purposes (but not for telemarketing, or for any other kind of marketing). The interface shown could be interactive: each box might toggle upon a mouse click (or other indication), thereby allowing the user to change one of the boxes from "allow" to "disallow".

It is noted that the interface shown in FIG. 2 represents a user's choices as to how a particular entity ("Acme") can use the user's data. For each entity that could potentially use the user's data, a similar interface could be presented, and the user could make different choices for each entity. For example, a similar interface for ABC Corp. could be presented to the user, and the user might make different choices about how ABC Corp. can use the user's data. Moreover, each user on a service could complete a set of choices for each company. Thus, the interface shown in FIG. 2 is for one user, and for one entity. If a service has m users and there are n entities that could potentially access a user's data, the chart represented by FIG. 2 could be completed as many as m×n times.

Figure 3:
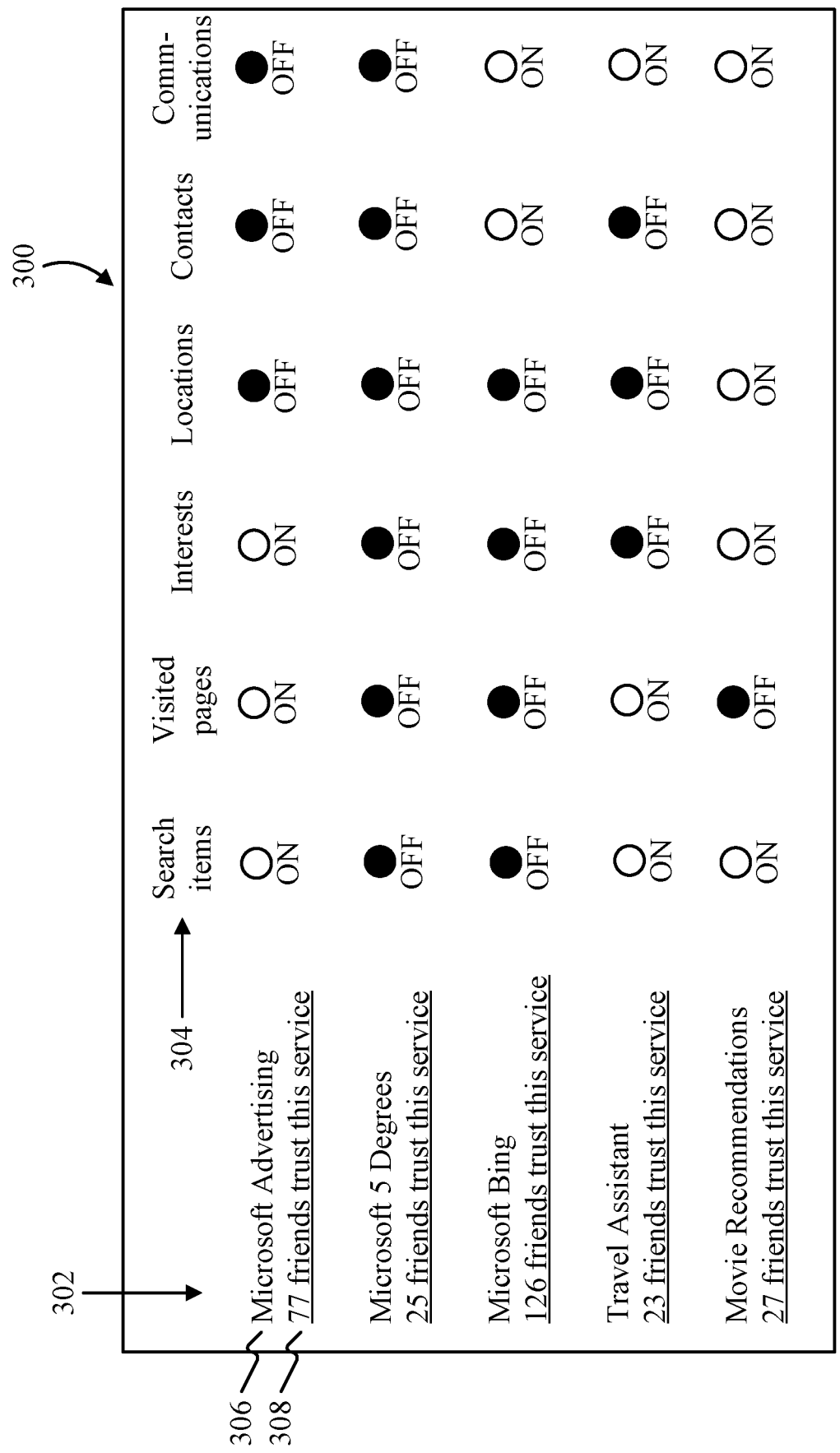
FIG. 3 is a block diagram of an example user interface in which a user may make decisions about which entities to trust with different types of data.

FIG. 3 shows an example user interface in which a user may make decisions about which entities to trust with different types of data. (In general, a decision to share data with an entity represents a decision to trust that entity with one's data.) Interface 300 contains a list 302 of different entities. The user may be given the option to trust, or not to trust, the entities on the list. Additionally, interface 300 shows a list of different types or categories 304 of data, access to which can be separately controlled by a user. The categories in the example of FIG. 3 are search items, visited pages, interests, locations, events, contacts, and communications. The particular categories that are used might be chosen based on the type of service to which the data relates—e.g., a social networking service might have categories of data (e.g., photos, posts, personal data, etc.) that are different from those that would exist in an e-mail service (e.g., messages, appointments, tasks, contacts, etc.).

For each entity in list 302, there may be a visible indication of whether other users trust that entity. For example, list 302 includes entity 306 ("Microsoft Advertising"). A given user may be using interface 300 to make a decision about which entities to trust, and, as indicated by arrow 308, 77 of the user's friends trust the service. (The concept of "friends" might be specific to a specific type of social networking service, but many sites do support the concept of people who are known to the user, of which "friends" is merely one example. As other examples, a social network might recognize the unidirectional concept of "followers", or an e-mail service might recognize the concept of "contacts." When interface 300 is deployed in such a service, it might say "77 of your followers trust this service," or "77 of your contacts trust this service".) A user can use information about which of his friends (or followers, or contacts, etc.) trust a service in order to assist the user in making decisions about whether the user himself will trust the service.

As noted above, the issue of whether a user can learn that other users trust the service is itself a matter that is subject to data protection. For example, user A might be friends with user B, but user B might determine that he does not want anyone to know which services he trusts. User B might therefore use an interface (such as that shown in FIG. 2) to deny access to data about which services he trusts. Or, user B might allow that data to be used anonymously, but not in associated with user B's name. If user A is using interface 300 to determine which services to trust, interface 300 might provide a "hover" behavior associated with the "77 friends trust this service" statement—e.g., by using a mouse to hover over this statement, a user might be able to see specifically which friends trust this service. If user B has allowed his trust information to be used only anonymously, then user B's trust of entity 306 might be included in the count of friends who trust this service, but user B's name would not appear in the list of trusting users who are shown to user A. If user B has entirely prevented the use of data about his trust relationships, then user B's trust of entity 306 might not even appear in the count of friends who trust entity 306. Moreover, user B can decide which entities to reveal trust relationships for—e.g., user B might allow it to be known to his friends that he trusts a game service, but not that he trusts a dating service.

Figure 4:
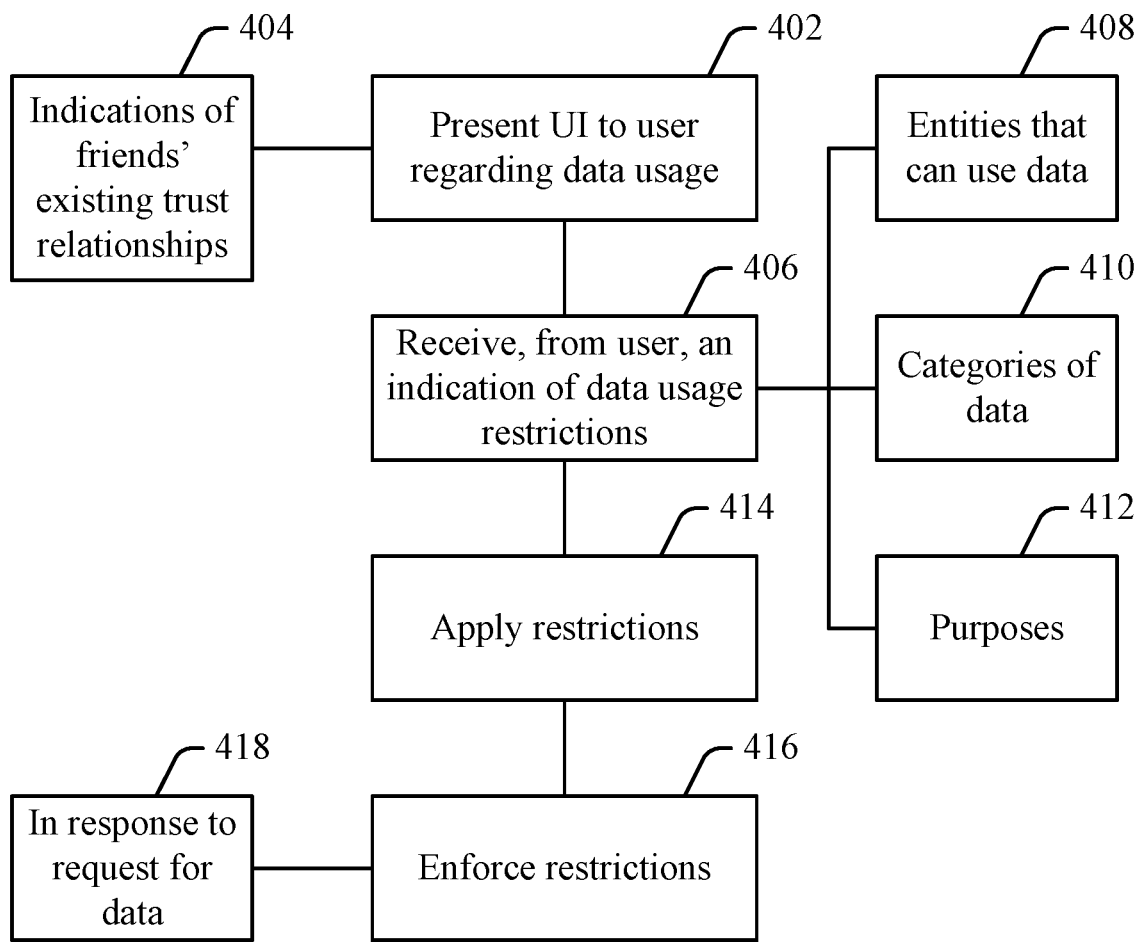
FIG. 4 is a flow diagram of an example process in which a user may indicate how his data is to be used, and in which the user's restrictions on data use may be enforced.

FIG. 4 shows an example process in which a user may indicate how his data is to be used, and in which the user's restrictions on data use may be enforced. Before turning to a description of FIG. 4, it is noted that the flow diagram of FIG. 4 is described, by way of example, with reference to components shown in FIGS. 1-3, although this process may be carried out in any system and is not limited to the scenarios shown in FIGS. 1-3. Additionally, the flow diagram in FIG. 4 shows an example in which stages of a process are carried out in a particular order, as indicated by the lines connecting the blocks, but the various stages shown in this diagram can be performed in any order, or in any combination or sub-combination.

At 402, a user interface (UI) is presented to a user, where the UI relates to the user's data and how that data may be used. FIGS. 2 and 3 are examples of such interfaces, although the interface may take any appropriate form, and is not limited to the examples shown in FIGS. 2 and 3. In one example, the interface allows a user to choose specific categories of data, and how those categories of data are allowed to be used by a particular entity (as in FIG. 2). In another example, the interface shows indications of the users' friends (or other contacts') trust relationship (block 404), so that the user can make a decision about whether to trust those entities (as shown in FIG. 3).

At 406, indications of data usage restrictions are received from the user. These restrictions may comprise various components. Some example components of these restrictions are the entity that is subject to the restrictions (block 408), the categories of data that can be separately restricted (block 410), and the purposes for which data can be used (block 412). With reference to the examples of FIG. 2, "Acme" is an entity subject to restrictions, the labels on rows 202 are categories of data, and the labels on columns 204 are purposes for which data can be used. It is noted that there may be default restrictions on certain classes of data—i.e., some data may be considered usable by default, and some data may be considered non-usable by default. Thus, the user may choose how his data is to be used by changing the defaults.

At 414, the restrictions specified by the user are applied. Records are kept indicating how the user will allow his data to be used. Based on these records, the restrictions may be enforced at 416. Enforcement of the restrictions may take various forms. In one example, the service that maintains the data acts as a gatekeeper for the data—i.e., the service receives requests for the data (block 418) and either allows or denies the requests based on whether the request complies with the restrictions specified by the user. In another example, the service itself is the potential consumer of the data, in which case the service enforces the user's restrictions by using the data only in accordance with the permitted ways that the user has specified. Another example is one in which the data to be controlled is not maintained by the service itself, but rather the data to be controlled is maintained by other services, and the service that enforces the user's restrictions does so by contacting these other services to change the user's data policy with those other services. In yet another example, the service obtains the user's permission settings for data, and other services can poll the service to find out what permissions the user has set, and those other services can adapt their behavior accordingly. In yet another example, the service may obtain the user's permission settings, and propagate those settings to other services, where the other services are responsible for adapting their behavior accordingly. It is noted that any of these scenarios are examples of a service enforcing the user's restrictions. Moreover, for the purpose of the subject matter herein, when service A affects the user of data stored on service B, service A is "managing" the data stored on service B. For example, if service A receives the user's permission settings and either propagates those settings to another service, or makes the permission settings available to be retrieved by the other service, then service A is managing data on service B for the purpose of the subject matter herein.

Figure 5:
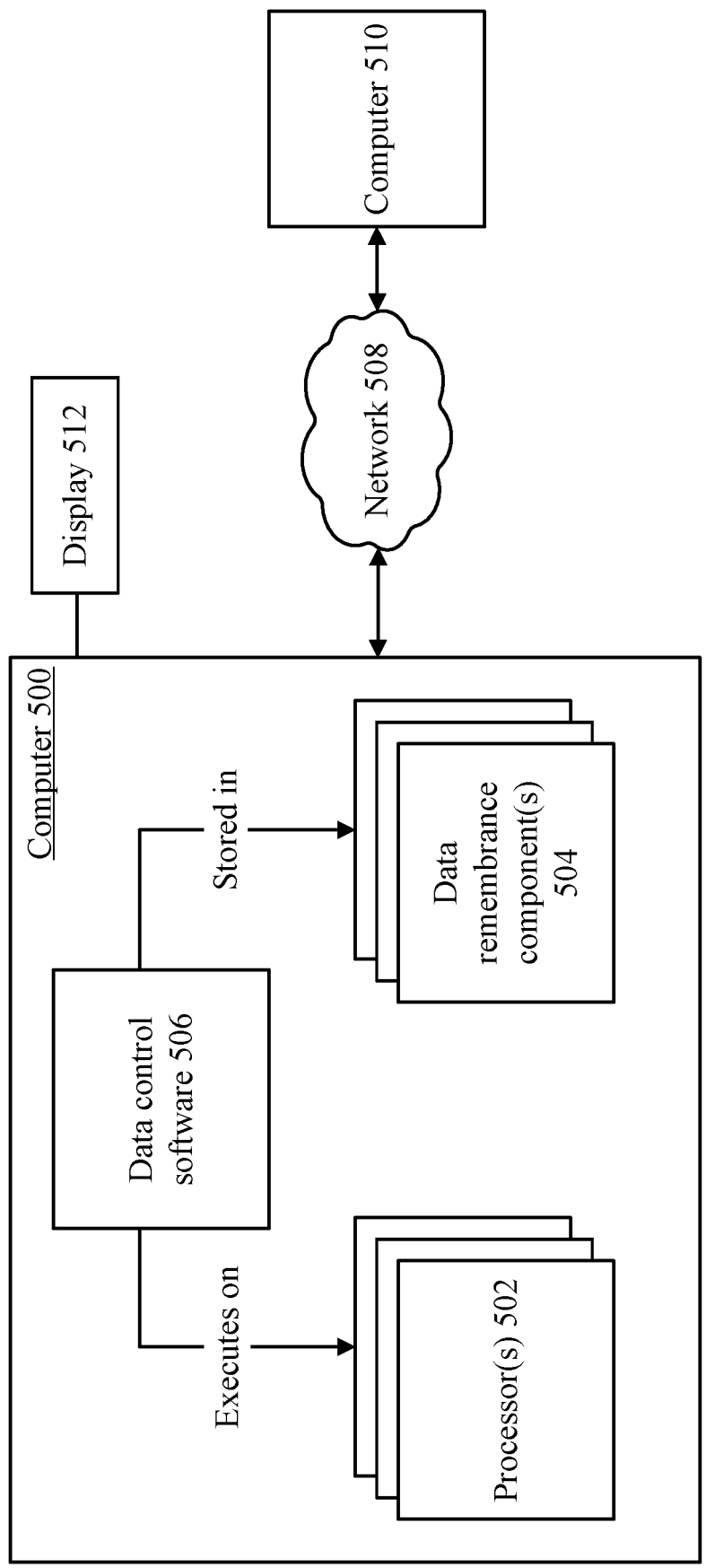
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is data control software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable media, regardless of whether all of the instructions happen to be on the same medium. The term "computer-readable media" does not include signals per se; nor does it include information that exists solely as a propagating signal. It will be understood that, if the claims herein refer to media that carry information solely in the form of a propagating signal, and not in any type of durable storage, such claims will use the terms "transitory" or "ephemeral" (e.g., "transitory computer-readable media", or "ephemeral computer-readable media"). Unless a claim explicitly describes the media as "transitory" or "ephemeral," such claim shall not be understood to describe information that exists solely as a propagating signal or solely as a signal per se. Additionally, it is noted that "hardware media" or "tangible media" include devices such as RAMs, ROMs, flash memories, and disks that exist in physical, tangible form; such "hardware media" or "tangible media" are not signals per se. Moreover, "storage media" are media that store information. The term "storage" is used to denote the durable retention of data. For the purpose of the subject matter herein, information that exists only in the form of propagating signals is not considered to be "durably" retained. Therefore, "storage media" include disks, RAMs, ROMs, etc., but does not include information that exists only in the form of a propagating signal because such information is not "stored."

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system comprising:
    a processor; and
    memory storing instructions that, when executed by the processor, cause the processor to perform acts comprising:
        obtaining user data for a user, the user data corresponding to multiple categories of data;
        presenting, by way of a user interface at a client computing device of the user that is in network communication with the computing system, a grid comprising the multiple categories of data and user-selectable purposes, wherein a purpose of the user-selectable purposes is indicative of a usage restriction on a computer-implemented service with respect to data belonging to a category of the multiple categories of data;
        for each category of data, receiving, by way of the user interface, a respective purpose selected by the user from amongst multiple selectable purposes wherein the usage restriction of the respective purpose applies to an act associated with the purpose;
        applying the usage restrictions to the obtained user data that the computer-implemented service maintains for the user; and
        enforcing the usage restrictions.

2. The computing system of claim 1, wherein rows of the grid presented by way of the user interface correspond to the multiple categories of data and columns of the grid correspond to the multiple selectable purposes.

3. The computing system of claim 1, wherein the user data is obtained from the computer-implemented service, and the acts of obtaining, receiving, applying, and enforcing are performed by a second computer-implemented service.

4. The computing system of claim 1, wherein the acts of obtaining, receiving, applying, and enforcing are performed by the computer-implemented service.

5. The computing system of claim 4, wherein the computer-implemented service is a social networking service.

6. The computing system of claim 4, wherein the computer-implemented service is a photo sharing service.

7. The computing system of claim 1, the acts further comprising: receiving an identity of the computer-implemented service from the client computing device.

8. The computing system of claim 1, further comprising causing a user interface to be presented to a user on a client computing device operated by the user, wherein the user interface includes selectable elements that facilitate user selection of purposes for the user data.

9. A method performed by a server computing the device, wherein the method facilitates applying usage restrictions on user data for a user, the method comprising:
    obtaining the user data for a user, the user data comprising first data that belongs to a first category and second data that belongs to a second category;
    for the first data that belongs to the first category, receiving, from a client computing device of the user that is in network communication with the server computing device, a first purpose selected by the user from amongst multiple selectable purposes by way of a user interface at the client computing device, wherein the user interface comprises a grid, wherein the first purpose identifies a first usage restriction on a computer-implemented service with respect to the first data that belongs to the first category, wherein the first usage restriction applies to a first act associated with the first purpose;
    for the second data that belongs to the second category, receiving, from the client computing device, a second purpose selected by the user from amongst the multiple selectable purposes presented by way of a user interface at the client computing device, wherein the user interface comprises a grid, wherein the second purpose identifies a second usage restriction on the computer-implemented service with respect to the second data that belongs to the second category, wherein the second usage restriction applies to a second act associated with the second purpose;
    applying the first usage restriction to the first data that belongs to the first category;
    applying the second usage restriction to the second data that belongs to the second category; and
    enforcing the first usage restriction and the second usage restriction.

10. The method of claim 9, wherein the computer-implemented service maintains the user data.

11. The method of claim 9, further comprising:
    causing the user interface to be displayed on a display of the client computing device, wherein the user interface includes a grid that comprises a first axis and a second axis, wherein categories of data are listed along the first axis and purposes are listed along the second axis, and further wherein the first purpose for the first data is received based upon interaction of the user with a first cell in the grid and the second purpose for the second data is received based upon interaction of the user with a second cell in the grid.

12. The method of claim 9, wherein acts of the method are performed by a second computer-implemented service that is different from the computer-implemented service.

13. The method of claim 9, wherein the computer-implemented service is a social networking service.

14. The method of claim 9, wherein the computer-implemented service is a photo sharing service.

15. The method of claim 9, wherein the user data comprises at least one of text, photos, video, or audio.

16. The method of claim 9, wherein the computer-implemented service is a gaming service.

17. A non-transitory computer-readable storage device comprising instructions that, when executed by a processor, cause the processor to perform acts comprising:
 obtaining user data for a user, the user data corresponding to multiple categories of data; and
 presenting by way of a user interface at a client computing device of the user that is in network communication with the computing system, a grid comprising the multiple categories of data and user-selectable purposes, wherein a purpose of the user-selectable purposes is indicative of a usage restriction on a computer-implemented service with respect to data belonging to a category of the multiple categories of data;
 for each category of data, receiving, by way of the user interface, a respective purpose selected by the user from amongst multiple selectable purposes wherein the usage restriction of the respective purpose applies to an act associated with the purpose;
 applying the usage restrictions to the obtained user data that the computer-implemented service maintains for the user; and
 enforcing the usage restrictions.

18. The non-transitory computer-readable storage device of claim 17, wherein rows of the grid presented by way of the user interface correspond to the multiple categories of data and columns of the grid correspond to the multiple selectable purposes.

19. The non-transitory computer-readable storage device of claim 17, wherein the user data is obtained from the computer-implemented service, and the acts of obtaining, receiving, applying, and enforcing are performed by a second computer-implemented service.

20. The non-transitory computer-readable storage device of claim 17, wherein the acts of obtaining, receiving, applying, and enforcing are performed by the computer-implemented service.

* * * * *